(No Model.)

W. A. PIERCE.
GATE.

No. 422,831. Patented Mar. 4, 1890.

Witnesses,
Geo. H. Strong
J. H. Nourse

Inventor,
William A. Pierce
By Dewey & Co.
Attys

UNITED STATES PATENT OFFICE.

WILLIAM A. PIERCE, OF NAPA, CALIFORNIA.

GATE.

SPECIFICATION forming part of Letters Patent No. 422,831, dated March 4, 1890.

Application filed October 2, 1889. Serial No. 325,759. (No model.)

*To all whom it may concern:*

Be it known that I, WILLIAM A. PIERCE, a citizen of the United States, residing at Napa city, Napa county, State of California, have invented an Improvement in Gates; and I hereby declare the following to be a full, clear, and exact description of the same.

My invention relates to that class of gates which are operated by means of suitable connecting cords or ropes, whereby the gate is moved from side to side to open and close the roadway; and my invention consists in the construction and combination of devices which I shall hereinafter fully describe and claim.

The object of my invention is to provide a simple and effective gate, adapted to be readily and easily operated, moving with but little exercise of power and with the minimum of friction.

Figure 2:
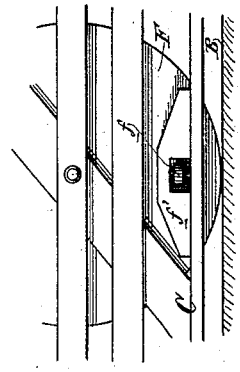
Figure 1:
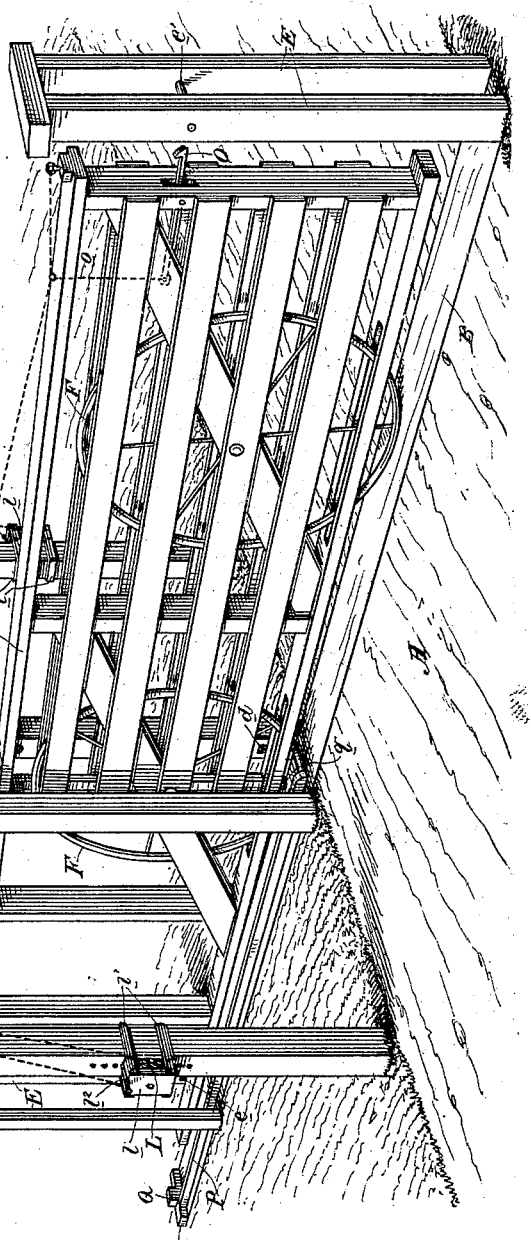

Referring to the accompanying drawings for a more complete explanation of my invention, Figure 1 is a perspective view of my gate. Fig. 2 is a detail elevation showing anti-friction roller $f$.

A is the roadway.

B is a beam or other hard surface, laid or formed in the roadway transversely thereto and serving as a track on which the gate moves from side to side.

C is the gate formed with an extension or guide portion $c$. This gate travels between the spaced or two-part guide-post D at the center and spaced or two-part end posts E at each side, and into these posts are let anti-friction rollers $d$ and $e$, for the purpose of permitting the gate to move easily. The gate is mounted upon or carried by wheels F, the diameters of which approximate to the height of the gate, so that the latter moves with but little friction, its wheels overcoming slight obstacles without trouble.

G are posts set on each side of the gate and at one side of the roadway.

Mounted upon the center post D is a shaft H, carrying on its center a winding-drum K, and on each end a pulley I, to which are secured the pull-ropes J. One end of a rope J is attached to and passes about a pulley I in one direction, and the other end of the same rope is attached to and passes about the same pulley in the other direction. The rope passes up over suitable guide-blocks $j$ on the center post, thence through guide-blocks $j'$ on the side post or arms thereof, and thence down to a gravity tightener-pulley L on the side post, passing its bight around said pulley. The pulleys I are preferably double-faced ones, as shown, to avoid any interference of the ends of the ropes J.

The tightener-pulley L is mounted in a block $l$, to which are secured the bail-straps $l'$, which embrace the side post freely enough to allow the block and pulley to bear down by gravity, thus keeping the rope J taut. Any upward movement of the block is prevented by a removable pin $l^2$, inserted just above it in any of a series of holes $g$ in the side post, and said pin also regulates and defines the position of the block, thus providing for taking up any slack in the rope J by setting said block lower down on the post.

Secured to the winding-drum K is a rope M, which extends and is secured to one end of the gate, and a second rope N is secured to the drum and extends and is secured to the other end of the gate or its extension portion.

O is a pivoted latch carried by the gate and adapted to engage a cross-bolt $e'$ in one of the end posts. From the inner end of this latch extends upwardly a cord $o$, attached at its upper end to rope M.

When the wheels F which carry the gate are made of wood, I find it preferable to use small anti-friction rollers $f$, mounted in bearings $f'$ on the lower rail of the gate, said rollers bearing against the wheel side, and thus keeping said wheel away from frictional contact with the walls of the slot of the rail. When the wheels F are of iron and made narrow, so as not to fill the slot, there is not so much need, if any, for the employment of the rollers $f$, though they may be used, if desired. If the lower rail of the gate has any tendency to rub too hard against the anti-friction rollers $d$ and $e$ of the posts D and E, caused by the gate's inclining to one side, I can remedy this difficulty by the use of a guard-rail P, located on the track B, so that the wheels F run by and against its side, thus keeping said wheels straight. This guard-rail need not extend upon the roadway, nor probably upon more than one side, and, in fact, will not be required at all in case the work is true.

The operation of the gate is as follows: The traveler approaching grasps one side of the pull-rope J, and pulling down upon it thereby turns pulley I and shaft H, thus operating drum K and winding up rope M and paying out rope N. The immediate tightening of rope M pulls up cord $o$ and releases the latch. Then the rope M pulls the gate open. After passing through the gateway the traveler seizes the other rope J, and by pulling upon it returns and closes the gate. The large carrying-wheels F, I find to be of decided advantage in reducing friction and making the gate move very easily. The pull-ropes J are simple, and by passing their bights about the tightener-pulleys I secure from each the effect of two ropes—one for opening and one for closing—and yet avoid the use of separate ropes. A block Q on the end of track B serves as a stop against which a block $q$ on the bottom rail of the gate comes in contact to limit the opening of the gate. A stake driven in the ground at the end of the track may be used as a stop.

Having thus described my invention, what I claim as new, and desire to secure by Letters Patent, is—

1. In combination with the rolling gate and winding-drum and ropes for operating it, the pulleys I, the pull-ropes J, the side posts G, and the tighteners about which the pull-ropes pass, consisting of the pulleys L, mounted in the blocks $l$, the straps secured to the blocks and freely embracing the side posts, and the removable and adjustable pin $l^2$, adapted to fit into a series of holes in the side post to regulate the position of the blocks, substantially as described.

2. The rolling gate and its wheels operating through the slotted bottom rail of the gate, in combination with the anti-friction rollers mounted in the gate-rail and bearing against the side of the wheels, substantially as described.

In witness whereof I have hereunto set my hand.

WILLIAM A. PIERCE.

Witnesses:
J. W. REAMS,
E. D. HAM.